United States Patent
Lin (10) Patent No.: US 7,664,190 B1
(45) Date of Patent: Feb. 16, 2010

(54) MULTI-CARRIER RECEIVER WITH DYNAMIC POWER ADJUSTMENT AND METHOD FOR DYNAMICALLY ADJUSTING THE POWER CONSUMPTION OF A MULTI-CARRIER RECEIVER

(75) Inventor: Che-Li Lin, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 12/185,232

(22) Filed: Aug. 4, 2008

(51) Int. Cl.
*H04K 1/10* (2006.01)

(52) U.S. Cl. ...................................... 375/260

(58) Field of Classification Search .............. 375/260, 375/262, 265, 267, 340, 341, 346, 350; 370/208, 370/210
See application file for complete search history.

(56) References Cited

U.S. PATENT DOCUMENTS

| | | | |
|---|---|---|---|
| 2006/0262869 A1* | 11/2006 | Yoshida | 375/260 |
| 2007/0053453 A1* | 3/2007 | Yeh et al. | 375/260 |
| 2008/0225936 A1* | 9/2008 | Hong et al. | 375/230 |
| 2008/0317153 A1* | 12/2008 | Sadek et al. | 375/262 |
| 2009/0225913 A1* | 9/2009 | Nakahara et al. | 375/347 |

FOREIGN PATENT DOCUMENTS

EP 1624622 2/2006

OTHER PUBLICATIONS

DE Office Action mailed Feb. 23, 2009.
English abstract of DE Office Action mailed Feb. 23, 2009.

* cited by examiner

*Primary Examiner*—Young T. Tse
(74) *Attorney, Agent, or Firm*—Thomas, Kayden, Horstemeyer & Risley (57) ABSTRACT

A method for dynamically adjusting the power consumption of a multi-carrier receiver and a multi-carrier receiver with dynamically power adjustment. The method includes receiving a multi-carrier signal, wherein the multi-carrier signal comprises a plurality of sub-carriers. Channel characteristics of each sub-carrier are estimated according to the demodulated multi-carrier signal. ICI strength is estimated from the demodulated multi-carrier signal. A system performance is detected. The estimated ICI is subtracted when the ICI strength exceeds an ICI threshold and the system performance is less than a system performance threshold. The demodulated multi-carrier signal is then equalized is based on the estimated channel characteristics, and the system performance is updated according to the equalized multi-carrier signal.

21 Claims, 7 Drawing Sheets

| | | |
|---|---|---|
| 191 | Last data padding column | |
| | ⋮ | |
| | First data padding column | |
| | Last IP datagram | Padding bytes |
| column 1 - 191 | ⋮ | |
| | 2nd IP datagram cont. | 3rd IP datagram |
| | 1st IP datagram cont. | 2nd IP datagram |
| 1 | 1st IP datagram | |

Application data table

Row #1 - No_of_rows

MULTI-CARRIER RECEIVER WITH DYNAMIC POWER ADJUSTMENT AND METHOD FOR DYNAMICALLY ADJUSTING THE POWER CONSUMPTION OF A MULTI-CARRIER RECEIVER

BACKGROUND OF THE INVENTION

Field of the Invention

The invention relates to receiving multi-carrier signals, and, more particularly, to receiving multi-carrier signals with dynamic power adjustment.

Multi-carrier modulation methods, such as orthogonal frequency division multiplexing (OFDM), have been around for some time now. OFDM is a modulation method designed in the 1970's in which multiple symbols are transmitted in parallel using different sub-carriers. An OFDM system forms its symbol by taking k complex QAM symbols $X_k$, each modulating a sub-carrier with frequency $$f_k = \frac{k}{T_u},$$

where $T_u$ is the sub-carrier symbol period. Each OFDM sub-carrier displays a $$\mathrm{sinc}(x) = \frac{\sin(x)}{x}$$

spectrum in the frequency domain. By spacing each of the 2N+1 sub-carriers $$\frac{1}{T_u}$$

apart in the frequency domain, the primary peak of each sub-carrier's sinc (x) spectrum coincides with a null of the spectrum of every other sub-carrier. In this way, although the spectra of the sub-carriers overlap, they remain orthogonal to one another. OFDM is well known as a highly spectral efficient transmission scheme capable of dealing with severe channel impairment encountered in a wireless environment. The basic idea of OFDM is to divide the available spectrum into several sub-channels (sub-carriers). By making all sub-channels narrowband, they experience almost flat fading, which makes equalization very simple.

Mobile reception, however, remains one of the problems associated with OFDM systems. A moving receiver would experience Doppler shifts, which corrupt the orthogonality among each sub-carrier, and decrease the system performance. In such a case, inter-carrier interference (ICI) occurs because signal components from one sub-carrier cause interference with other, mostly neighboring, sub-carriers. Moving receivers also encounter time-varying channels. Time-varying channels also limit the system performance. Typically, an ICI canceller is applied to compensate ICI, and a long interleaver with additional forward error correction would enhance system performance. For example, Digital Video Broadcast Hand-held (DVB-H) has specified the use of multiprotocol encapsulation forward error correction (MPE-FEC) to provide an additional layer of interleaving and error correction in order to provide a more robust signal in mobile environments.

Although ICI cancellation and MPE-FEC can improve system performance, these two features consume relatively more power. Since handheld devices have limited battery power, system designers must compromise between system performance and power consumption.

BRIEF SUMMARY OF THE INVENTION

Accordingly, a multi-carrier receiver with optimized power consumption and satisfactory system performance is provided. In one aspect of the invention, a multi-carrier receiver with dynamic power adjustment is proposed. The multi-carrier receiver comprises a demodulator, an ICI detector, a system performance detector, a determination circuit, an ICI canceller, a channel estimator, and an equalizer. A multi-carrier signal is received by demodulator. The demodulated multi-carrier signal is supplied to an ICI canceller, an ICI detector, and a channel estimator. The channel estimator estimates channel characteristics of each sub-carrier. The system performance detector detects the performance of the system. The system performance, in some embodiments of the invention, can be signal-to-noise ratio (SNR) or bit error rate (BER). The ICI detector detects the ICI strength. The ICI strength along with system performance is sent to the determination circuit. The determination circuit turns on the ICI canceller only when the ICI strength exceeds an ICI threshold and the system performance is less than a system performance threshold. The ICI canceller, when turned on, subtracts an estimation of the ICI in the received multi-carrier signal from the demodulated multi-carrier signal. The operation of the equalizer is independent on estimated channel characteristics provided by the channel estimator. The output signal of the equalizer, comprising vectors of estimated symbols, is supplied to a system performance estimator.

In another aspect of the invention, a method for dynamically adjusting the power consumption of a multi-carrier is provided. The method begins with demodulating a multi-carrier signal, wherein the multi-carrier signal comprises a plurality of sub-carriers. Channel characteristics of each sub-carrier are estimated according to the demodulated multi-carrier signal. ICI strength is estimated according to the demodulated multi-carrier signal. System performance is then detected. The ICI strength is compared with an ICI threshold, and the system performance is compared with a system performance threshold. If the ICI strength exceeds an ICI threshold and the system performance is less than a system performance threshold, the estimated ICI is subtracted. The demodulated multi-carrier signal is equalized in dependence on the estimated channel characteristics, wherein the equalized multi-carrier signal is used to update the system performance. If the ICI strength is less than the ICI threshold or the system performance excesses the system performance threshold, the method omits subtraction of the estimated ICI.

BRIEF DESCRIPTION OF THE DRAWINGS

The invention will become more fully understood from the detailed description, given hereinbelow, and the accompanying drawings. The drawings and description are provided for purposes of illustration only, and, thus, are not intended to be limiting of the invention.

DETAILED DESCRIPTION OF THE INVENTION

Figure 1:
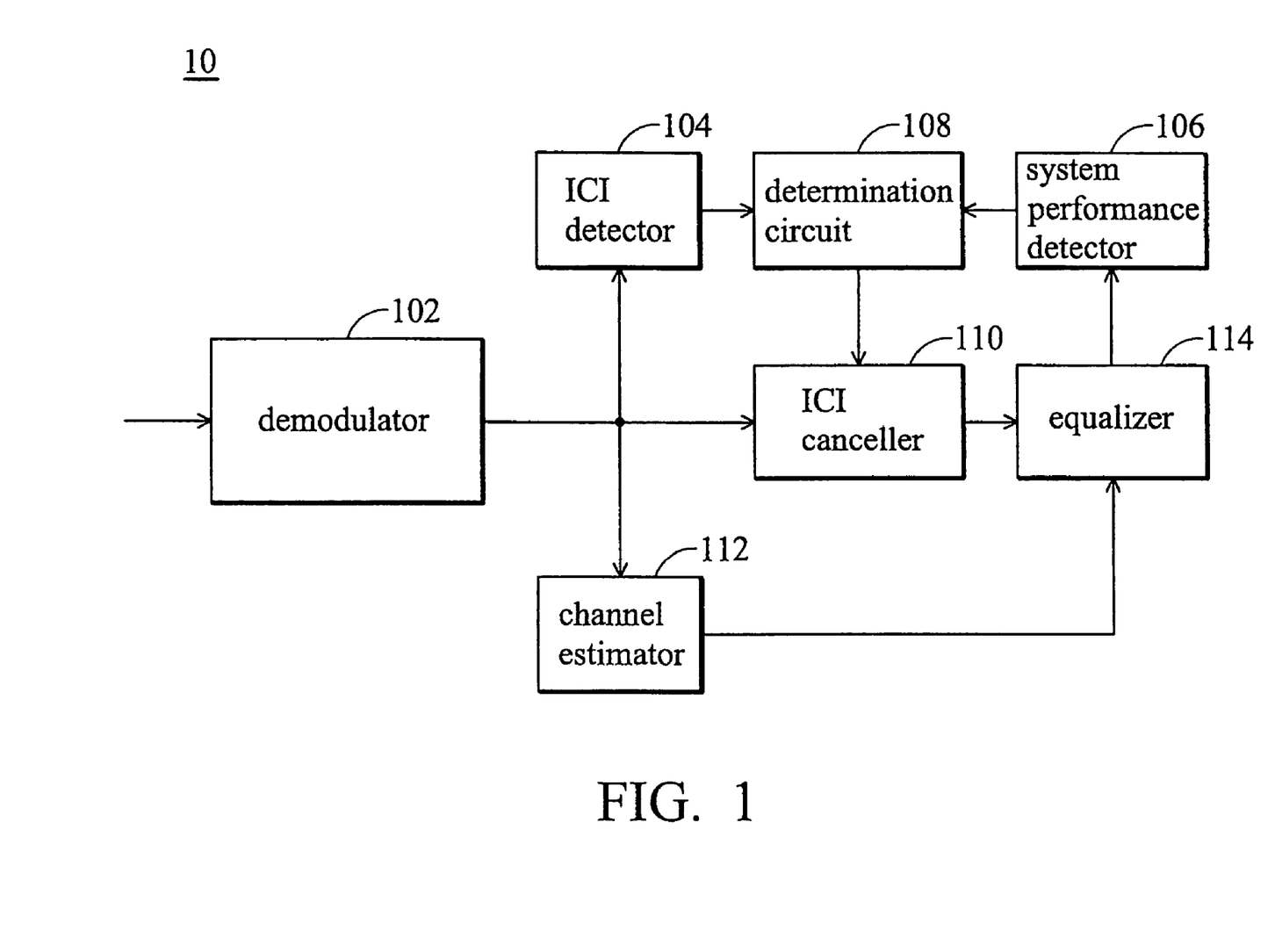
FIG. 1 shows a block diagram of an multi-carrier receiver with dynamic power adjustment.

FIG. 1 shows a block diagram of a multi-carrier receiver with dynamic power adjustment. The multi-carrier receiver 10 comprises a demodulator 102, an ICI detector 104, a system performance detector 106, a determination circuit 108, an ICI canceller 110, a channel estimator 112 and an equalizer 114. A multi-carrier signal, may be an OFDM signal or a MC-CDMA signal, is received by demodulator 102. The demodulator 102 may be implemented by means of an FFT. The demodulated multi-carrier signal is supplied to an ICI canceller 110, an ICI detector 104, and a channel estimator 112. The channel estimator 112 estimates channel characteristics of each sub-carrier, such as the amplitudes and time-derivatives of each sub-carrier. The system performance detector 106 detects the performance of the system. The system performance, in some embodiments of the invention, can be signal-to-noise ratio or bit error rate (BER). The ICI detector 104 detects ICI strength. The strength of ICI along with system performance is sent to the determination circuit 108. The determination circuit 108 turns on the ICI canceller 110 only when the ICI strength exceeds an ICI threshold and the system performance is less than a system performance threshold. In other words, when the ICI strength is less than the ICI threshold or the system performance exceeds the system performance threshold, the ICI canceller 110 is turned off. The ICI canceller 110, when turned on, subtracts an estimation of the ICI included in the received multi-carrier signal from the demodulated multi-carrier signal. The resulting "ICI-free" signal is supplied to an equalizer 114 for normal equalization of the signal. The operation of equalizer 114 is dependent on estimated channel characteristics, providing by the channel estimator 112. The output signal of the equalizer 114 is supplied to a system performance detector 106. In some embodiments of the invention, the ICI detector 104 is a velocity estimator, a Doppler frequency estimator, a timing variation of channel estimator, the amount of ICI cancellation estimator, or any estimator alike for monitoring ICI strength. The system performance detector can be an SNR estimator a BER estimator, or other estimators for reporting the quality of the receiver.

Figure 2:
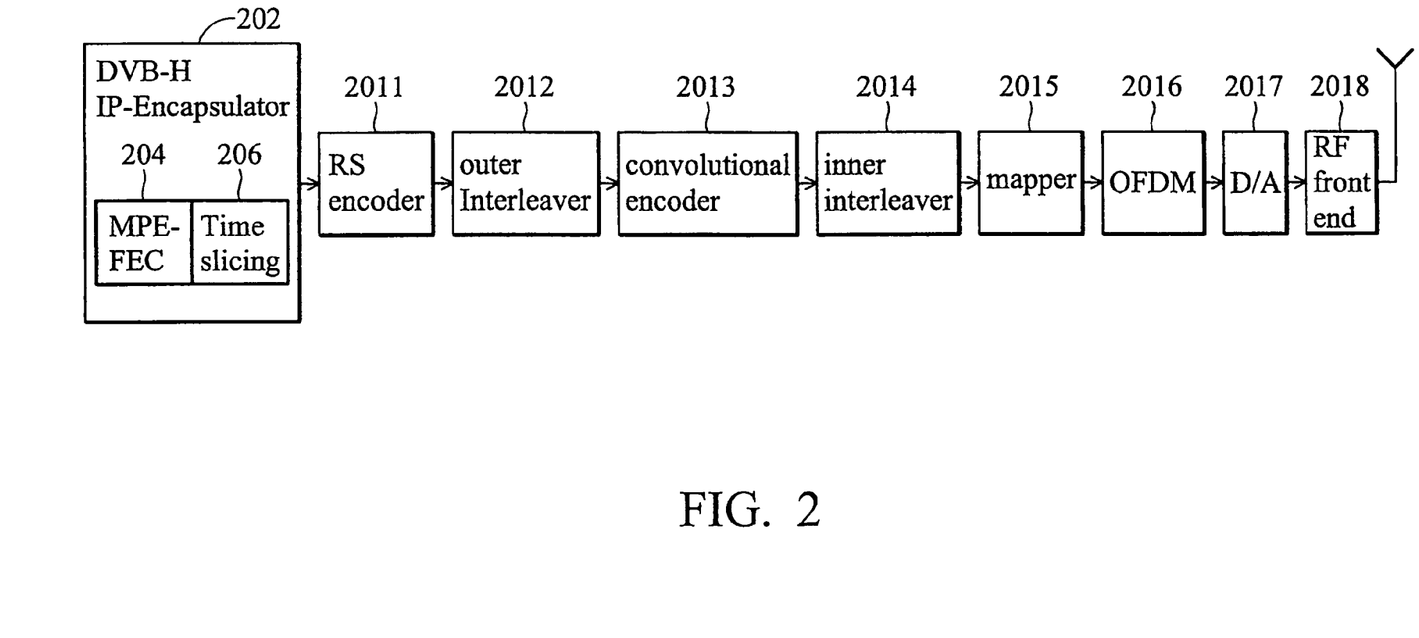
FIG. 2 shows a block diagram of a DVB-H transmitter.
Figure 3:
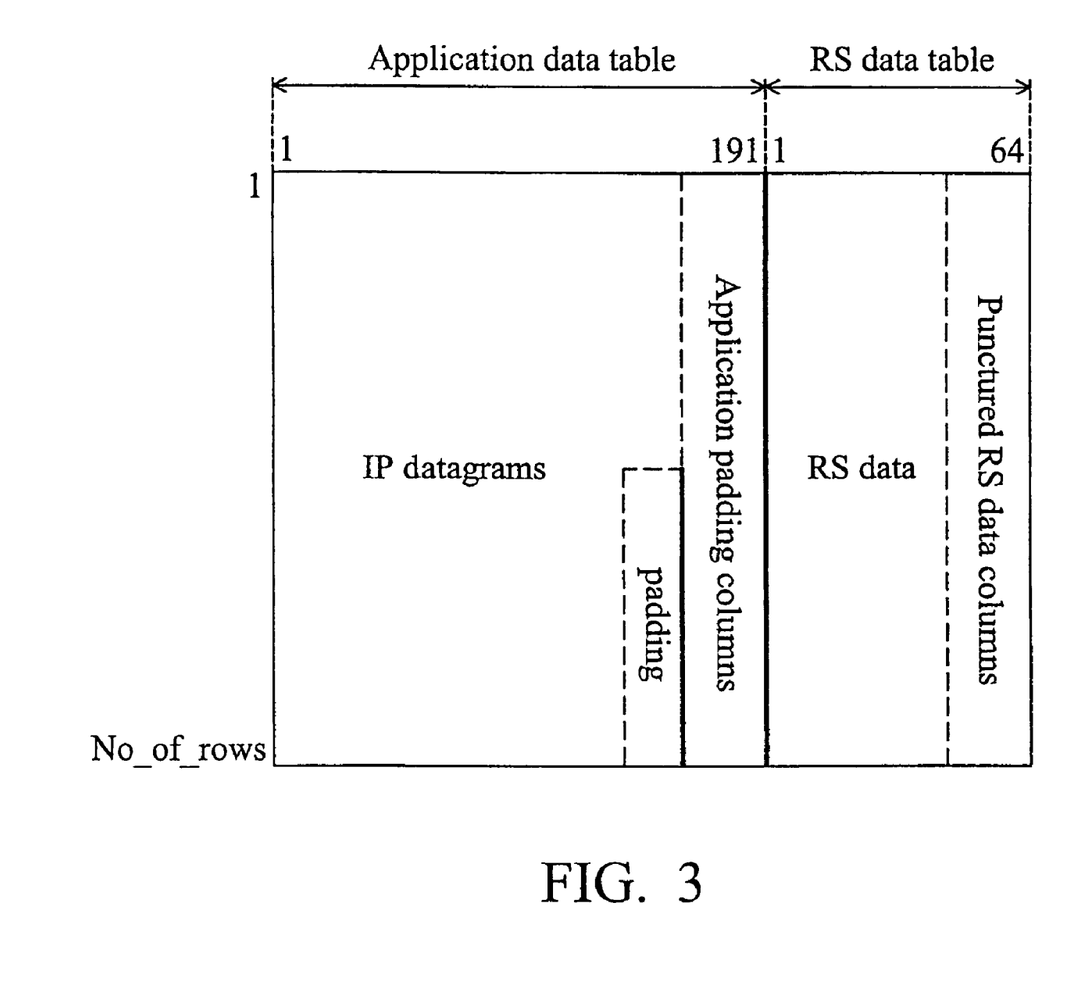
FIG. 3 shows a matrix of MPE-FEC.
Figure 4:
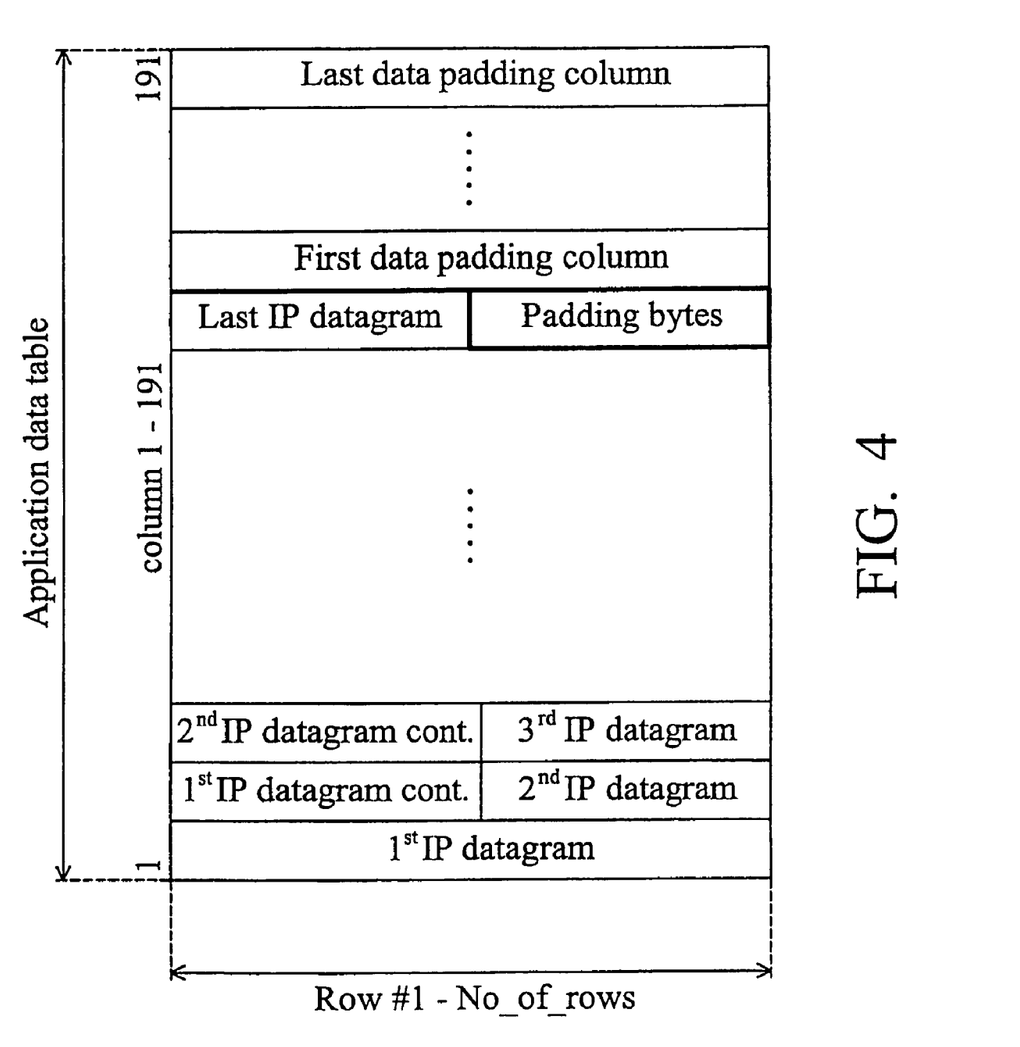
FIG. 4 shows the layout of the Application data table.

To improve the tolerance of Doppler effect in mobile channels, the equalizer 114 outputs is further supplied to a forward error correction (FEC) in one embodiment of the invention. For example, Digital Video Broadcast Hand-held (DVB-H) has specified the use of multiprotocol encapsulation forward error correction (MPE-FEC) to provide an additional layer of interleaving and error correction in order to provide a more robust signal in mobile environments. FIG. 2 shows a block diagram of a DVB-H transmitter. The DVB-H transmitter comprises a IP-encapsulator 202, an Reed-Solomon (RS) encoder 2011, an outer interleaver 2012, a convolutional encoder 2013, an inner interleaver 2014, a mapper 2015, an OFDM modulator 2016, a digital-to-analog converter (D/A) 2017, and a radio frequency (RF) front end 2018. The inner interleaver 2014 and the outer interleaver 2012 attempt to make the errors as randomly distributed as possible, so that the RS decoder and convolutional decoder (Viterbi) in receiver can take the most advantage from random errors. The IP-encapsulator 202 comprises a timing-slicing module 206 and a multiprotocol encapsulation-forward error correction (MPE-FEC) 204. The time-slicing 206 offers a flexible period and can be adapted to the DVB-H service. Time-slicing periods can be as high as 500 ms and as low as 50 ms. The MPE-FEC 204 offers an additional forward error correction function that allows the receiver to cope with particularly difficult reception situations. The MPE-FEC frame is arranged as a matrix with 255 columns and a flexible number of rows. FIG. 3 shows a matrix of MPE-FEC. The number of rows may vary from 1 to 1,024, depends on transmission conditions. Each position in the matrix holds an information byte. The left part of the MPE-FEC frame, consisting of the 191 leftmost columns, are dedicated for IP datagrams and possible padding, and is called the Application data table. FIG. 4 shows the layout of the Application data table. The right part of the MPE-FEC frame, consisting of the 64 rightmost columns, is dedicated for the parity information of the FEC code and is called the RS data table. Each byte position in the Application data table has an address ranging from 1 to 191 times number of rows (No_of_rows). In the same way, each byte position in the RS data table has an address ranging from 1 to 64 times number of rows. By adding parity information calculated from the IP datagrams and sending this parity data in separate MPE-FEC sections, error-free IP datagrams can be output (after MPE-FEC decoding) even under bad reception conditions. Each MPE-FEC section contains 16 bytes overhead caused by the header and CRC-32. By using the cyclic redundancy check (CRC) in the MPE-FEC packet header, it flags the MPE-FEC packet contents as unreliable if the CRC check fails. According to DVB-H specification, time-slicing is mandatory in a DVB-H system, and MPE-FEC is optional to use. The MPE-FEC standard is backward compatible with non-MPE-FEC-compliant receivers.

Figure 5A:
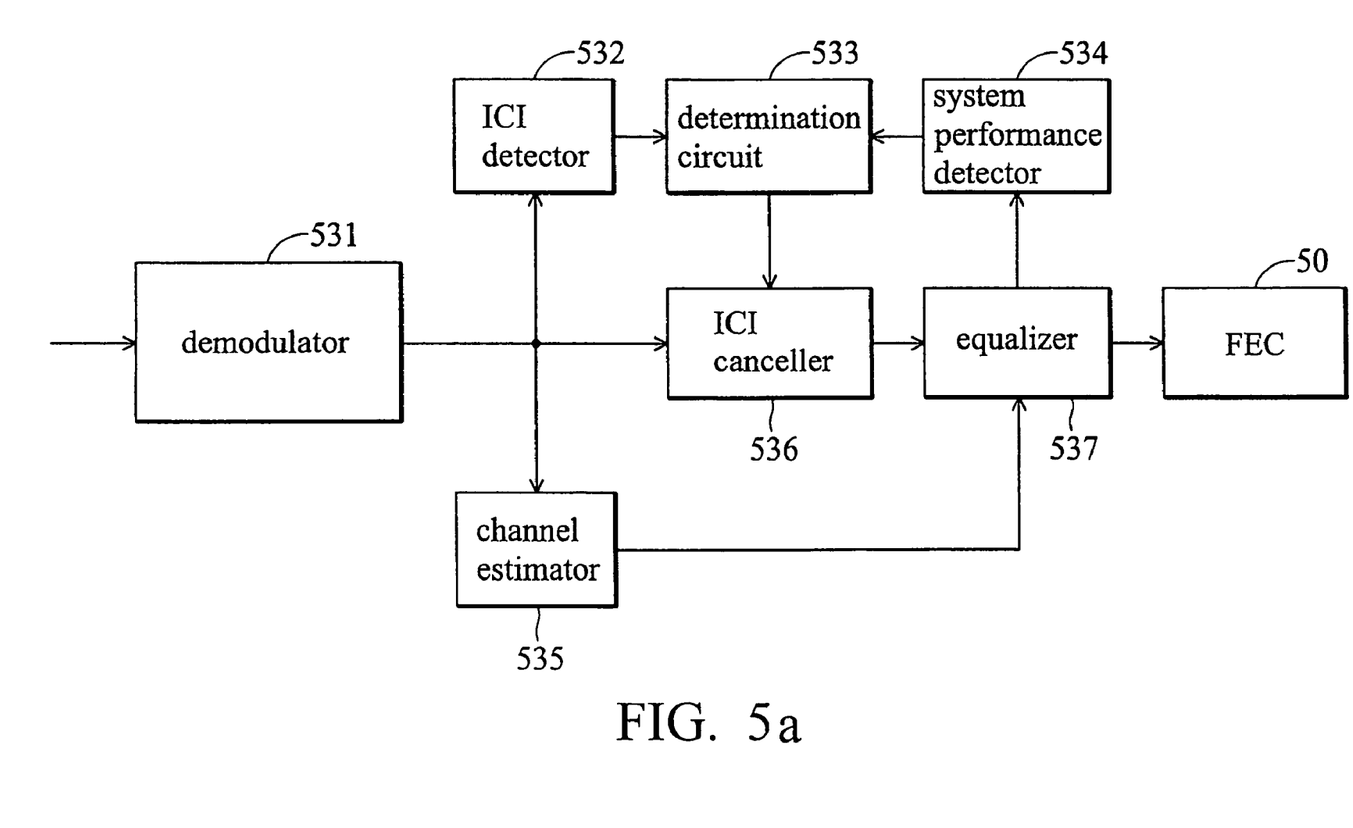
FIGS. 5a and 5b show another exemplary block diagram of OFDM receiver with dynamic power adjustment.
Figure 5B:
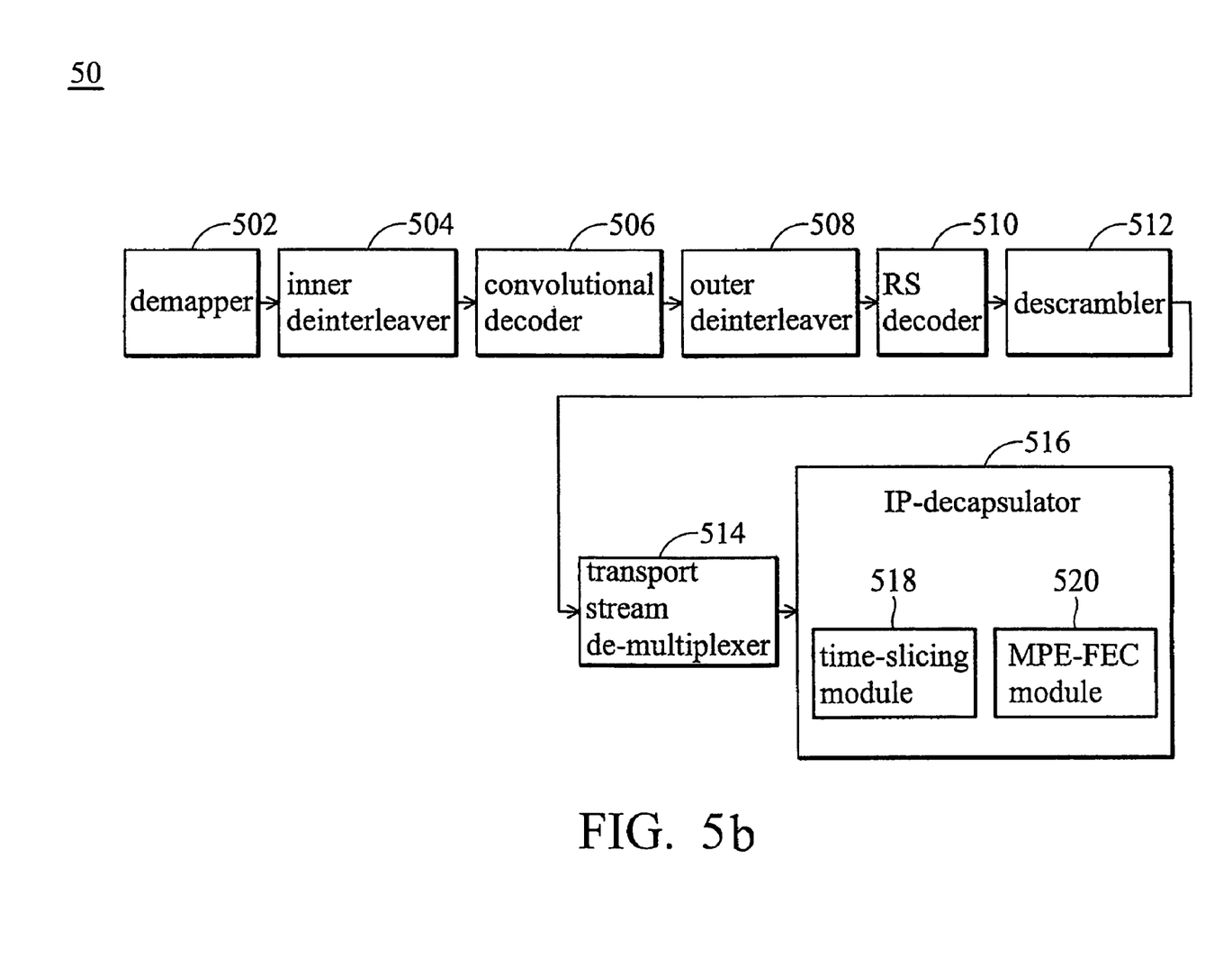

FIG. 5a shows a block diagram of another exemplary OFDM receiver with dynamic power adjustment. The exemplary OFDM receiver includes a demodulator 531, an ICI detector 532, a determination circuit 533, a system performance detector 534, a channel estimator 535, an ICI canceller 536, an equalizer 537 and a FEC 50. FIG. 5b illustrates an example for implementing the FEC 50. In FIG. 5b, the FEC 50 comprises a de-mapper 502, an inner deinterleaver 504, a convolutional decoder 506, an outer deinterleaver 508, a Reed-Solomon decoder 510, a descrambler 512, a transport stream de-multiplexer 514, and an IP-decapsulator 516. The IP-decapsulator 516 comprises a time-slicing module 518 and an MPE-FEC module 520. Among the depicted blocks, only the MPE-FEC module 520 can be occasionally turned on. When an MPE-FEC burst is received, the IP-decapsulator 516 needs to buffer the data within its memory for consumption during the time intervals. For every received section belonging to the Application data table or to the RS data table, the MPE-FEC module 520 looks in the section header for the start address (row number and column number) of the MPE-FEC frame within the section and is then able to put the MPE-FEC frame in the right position in the respective table. After this procedure, all received bursts can then be marked as either "reliable" or "unreliable" according to the CRC-32 checksum. Since the MPE-FEC may be ignored, the MPE-FEC module 520 determines if the all the MPE-FEC bursts are marked "reliable". If so, the MPE-FEC module 520 remains off to save power. Otherwise, the MPE-FEC module 520 is turned on. The MPE-FEC module 520, if on, can correct up to 64 error bytes out of the 255-byte codeword. If there are less than 64 unreliable byte positions in a row, the MPE-FEC module 520 will be able to correct all the errors. If there are more than 64 unreliable byte positions in a row, the MPE-FEC module 520 will be not able to correct anything and will therefore typically just output the byte errors without error correction.

Since MPE-FEC module and ICI cancellation are power consuming, selectively turning on the MPE-FEC and the ICI canceller can effectively reduce power consumption. This reduces the average power consumption of the receiver. The entire multi-carrier receiver is capable of bearing a weak ICI, thus turning on ICI canceller when ICI is weak is unnecessary.

Figure 6:
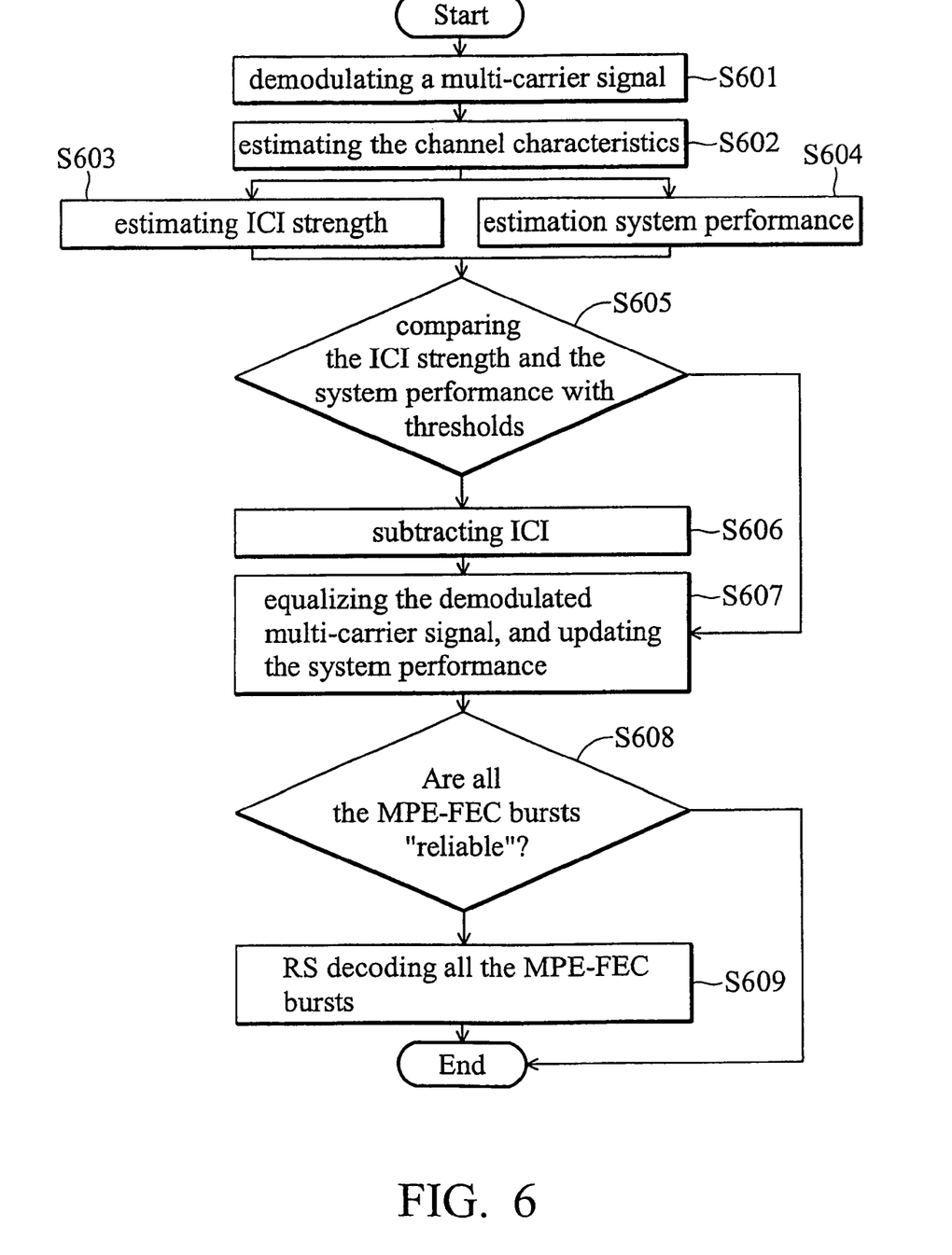
FIG. 6 shows a flowchart of a method for dynamically adjusting the power consumption of a multi-carrier receiver.

FIG. 6 shows a flowchart of a method for dynamically adjusting the power consumption of a multi-carrier. The method begins with demodulating a multi-carrier signal, wherein the multi-carrier signal comprises a plurality of sub-carriers in step S601. The multi-carrier signal may be an OFDM signal or a MC-CDMA signal. Channel characteristics of each sub-carrier are estimated according to the demodulated multi-carrier signal in step S602. In step S603, ICI strength is estimated according to the demodulated multi-carrier signal. In step S604, a system performance is detected. In some embodiments of the invention, the system performance is a signal-to-noise ratio (SNR) or a bit error rate (BER). In step S605, the ICI strength is compared with an ICI threshold, and the system performance is compared with a system performance threshold. If the ICI strength exceeds an ICI threshold and the system performance is less than a system performance threshold, the estimated ICI included in the received multi-carrier signal from the demodulated multi-carrier signal is subtracted in step S606. The demodulated multi-carrier signal is equalized in dependence on the estimated channel characteristics in step S607, wherein the equalized multi-carrier signal is used to update the system performance. If the ICI strength is less than the ICI threshold or the system performance exceeds the system performance threshold in step S605, the method goes to step S607 directly. In some embodiments of the invention, the ICI strength is in turns of velocity, Doppler frequency, channel variation or others alike.

In some embodiments, the equalized multi-carrier signal comprises 256 MPE-FEC bursts. The MPE-FEC bursts are checked in step S608. Each burst is marked as either "reliable" or "unreliable". If more than one burst is marked "unreliable", all the 256.MPE-FEC bursts are RS decoding in step S609. If all the MPE-FEC bursts are marked as reliable, a RS decoding step is skipped.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multi-carrier receiver with dynamic power adjustment, comprising:
    a demodulator receiving a multi-carrier signal, wherein the multi-carrier signal comprises a plurality of sub-carriers;
    a channel estimator estimating channel characteristics of each sub-carrier from the demodulated multi-carrier signal;
    multiprotocol capsulation forward error correction estimating channel characteristics of each sub-carrier from the demodulated multi-carrier signal;
    a system performance detector detecting a system performance;
    an ICI canceller subtracting the estimated ICI included in the received multi-carrier signal from the demodulated multi-carrier signal;
    a determination circuit turning on the ICI canceller when the ICI strength exceeds an ICI threshold and the system performance is less than a system performance threshold; and
    an equalizing the demodulated multi-carrier signal based on the estimated channel characteristics, wherein the equalized multi-carrier signal is supplied to the system performance detector for updating the system performance.

2. The multi-carrier receiver as claimed in claim 1, wherein the determination circuit turns off the ICI canceller when the ICI strength is less than the ICI threshold and the system performance exceeds the system performance threshold.

3. The multi-carrier receiver as claimed in claim 1 further comprising a multiprotocol encapsulation forward error correction (MPE-FEC) module, wherein the equalized multi-carrier signal comprises 256 bursts, each burst is marked as either "reliable" or "unreliable", if all the 256 bursts are marked "reliable", the MPE-FEC module remains off to save power, otherwise, the MPE-FEC module is turned on.

4. The multi-carrier receiver as claimed in claim 1, wherein the demodulator is implemented by an FFT.

5. The multi-carrier receiver as claimed in claim 1, wherein the system performance detector is a signal-to-noise ratio (SNR) estimator, and the system performance is an SNR.

6. The multi-carrier receiver as claimed in claim 1, wherein the system performance detector is a bit error rate (BER) estimator, and the system performance is a BER.

7. The multi-carrier receiver as claimed in claim 1, wherein the ICI detector is a velocity estimator, and the ICI strength is the velocity of the multi-carrier receiver.

8. The multi-carrier receiver as claimed in claim 1, wherein the ICI detector is a Doppler frequency estimator, and the ICI strength is in terms of Doppler frequency.

9. The multi-carrier receiver as claimed in claim 1, wherein the ICI detector is a channel variation estimator, and the ICI strength is in terms of channel variation.

10. The multi-carrier receiver as claimed in claim 1, wherein the multi-carrier signal is an OFDM signal.

11. The multi-carrier receiver as claimed in claim 1, wherein the multi-carrier signal is an MC-CDMA signal.

12. A method for dynamically adjusting the power consumption of a multi-carrier receiver, comprising:
    demodulating a multi-carrier signal, wherein the multi-carrier signal comprises a plurality of sub-carriers;
    estimating channel characteristics of each sub-carrier according to the demodulated multi-carrier signal;
    estimating an inter-carrier interference (ICI) strength of ICI from the demodulated multi-carrier signal;
    detecting a system performance;
    subtracting, by an ICI canceller, the estimated ICI included in a received multi-carrier signal from the demodulated multi-carrier signal to turn on the ICI canceller when the ICI strength exceeds an ICI threshold and the system performance is less than a system performance threshold; and
    equalizing the demodulated multi-carrier signal based on the estimated channel characteristics and updating the system performance according to the equalized multi-carrier signal.

13. The method as claimed in claim 12 further comprising turning off the ICI canceller when the ICI strength is less than the ICI threshold and the system performance exceeds the system performance threshold.

14. The method as claimed in claim 12, wherein the equalized multi-carrier signal comprises 256 bursts, each burst is marked as either "reliable" or "unreliable", and the method further comprises Reed-Solomon (RS) decoding the 256 bursts when more than one burst is marked unreliable.

15. The method as claimed in claim 12, wherein the system performance is a signal-to-noise ratio (SNR).

16. The method as claimed in claim 12, wherein the system performance is a a bit error rate (BER).

17. The method as claimed in claim 12, wherein the ICI strength is in terms of velocity.

18. The method as claimed in claim 12, wherein the ICI strength is in terms of Doppler frequency.

19. The method as claimed in claim 12, wherein the ICI strength is in terms of channel variation.

20. The method as claimed in claim 12, wherein the multi-carrier signal is an OFDM signal.

21. The method as claimed in claim 12, wherein the multi-carrier signal is an MC-CDMA signal.

\* \* \* \* \*